United States Patent
Harrington

(10) Patent No.: US 7,011,756 B2
(45) Date of Patent: *Mar. 14, 2006

(54) IN SITU IMMOBILIZATION OF METALS WITHIN DENSITY VARIANT BODIES OF WATER

(76) Inventor: Joseph G. Harrington, 11364 Peconic Dr., Boise, ID (US) 63709

(*) Notice: Subject to any disclaimer, the term of this patent is extended or adjusted under 35 U.S.C. 154(b) by 0 days.

This patent is subject to a terminal disclaimer.

(21) Appl. No.: 10/398,703
(22) PCT Filed: Oct. 3, 2001
(86) PCT No.: PCT/US01/31063

§ 371 (c)(1),
(2), (4) Date: Aug. 13, 2003

(87) PCT Pub. No.: WO02/28783

PCT Pub. Date: Apr. 11, 2002

(65) Prior Publication Data

US 2004/0020848 A1 Feb. 5, 2004

Related U.S. Application Data

(63) Continuation-in-part of application No. 09/678,272, filed on Oct. 3, 2000, now Pat. No. 6,350,380, which is a continuation-in-part of application No. 09/678,527, filed on Oct. 3, 2000, now abandoned.

(51) Int. Cl.
*C02F 1/62* (2006.01)
*C02F 3/28* (2006.01)

(52) U.S. Cl. ............... 210/603; 210/610; 210/611; 210/717; 210/747; 210/912; 210/913; 210/914; 435/262.5; 588/256; 405/128.5; 405/129.25

(58) Field of Classification Search ............ 210/603, 210/610, 611, 631, 707, 717, 747, 912, 913, 210/914; 435/262, 262.5; 588/256; 405/128.45, 405/128.5, 128.7, 128.75, 129.2, 129.25, 405/129.3

See application file for complete search history.

(56) References Cited

U.S. PATENT DOCUMENTS 4,108,722 A 8/1978 Stover (Continued)

FOREIGN PATENT DOCUMENTS

DE 19820320 11/1999

(Continued)

OTHER PUBLICATIONS

Translation of German application 198 20 320.*

(Continued)

*Primary Examiner*—Christopher Upton
(74) *Attorney, Agent, or Firm*—Thorpe North & Western LLP

(57) ABSTRACT

A method for treating (in situ) large bodies of water contaminated with heavy metals and having varying density stratas to immobilize the contaminant metals is disclosed. The method, or process for (in situ) immobilization of metals is focused on treating large bodies of water having metals therein that are also adjacent a border of soil or earthen materials in an attempt to immobilize the metals from penetrating through the soil. The method is also able to treat the soil water boundary within the pit lake to provide additional immobilization. The pit lakes can include open pit lakes, subterranean mine lakes, flowing streams and the like. The method is also able to treat an abandoned mine prior to the filling of the mine with water. Initially, the density mean of the body of water is determined, which is densest typical at regions at or approaching 4 degrees C. The process includes introducing a treatment substance that has a density greater than that of the density means into the body of water, providing at least one microbe proximate or in the body of water, producing microbial sulfides arising from the initial microbe placement, causing microbial sulfides to react (in situ) with metal ions or metal containing compounds located within the body of water, reducing the solubility of the metal ions by forming metal sulfides, and inhibiting the migration rate of the metal ions or other metal containing compounds within or from the soils or earthen materials as they settle out of the water.

12 Claims, 4 Drawing Sheets

U.S. PATENT DOCUMENTS

| | | | | |
|---|---|---|---|---|
| 4,354,937 A | * | 10/1982 | Hallberg | 210/611 |
| 4,522,723 A | * | 6/1985 | Kauffman et al. | 210/611 |
| 4,789,478 A | * | 12/1988 | Revis et al. | 210/611 |
| 5,510,032 A | * | 4/1996 | Vail et al. | 210/747 |
| 5,554,290 A | | 9/1996 | Suthersan | |
| 5,632,715 A | | 5/1997 | Harrington et al. | |
| 5,660,730 A | * | 8/1997 | Lucchese et al. | 210/611 |
| 5,833,855 A | | 11/1998 | Saunders | |
| 5,968,359 A | * | 10/1999 | Krahn et al. | 210/747 |

FOREIGN PATENT DOCUMENTS

| | | |
|---|---|---|
| WO | WO96/20797 | 7/1996 |
| WO | WO98/47820 | 10/1998 |
| WO | WO00/48949 | 8/2000 |

OTHER PUBLICATIONS

Translation of WO 00/48949.*
Translation of WO 96/20797.*

* cited by examiner

IN SITU IMMOBILIZATION OF METALS WITHIN DENSITY VARIANT BODIES OF WATER

This application claims the benefit of PCT Application US01/31063, filed Oct. 3, 2001, which is a Continuation-in-Part of U.S. application Ser. No. 09/678,272, filed Oct. 3, 2000, now U.S. Pat. No. 6,350,380; and Ser. No. 09/678,527, filed Oct. 3, 2000, now abandoned.

BACKGROUND OF THE INVENTION

This invention relates to methods for in situ immobilization of metals in water and earthen boundaries bordering the water as well as to immobilization treatment of metals in water having varying density zones to access and treat all regions within the water and at the water-earthen boundaries.

Waste stacks are generated by many types of industrial processes, often as a result of the extraction of valuable materials. The waste stacks are frequently piles of economically invaluable material left over from the industrial processes. For instance, power plants often generate waste stacks of ash. The ash is left over when energy is extracted from fuel by burning. Mining processes also often generate waste stacks. The waste stacks contain minerals left over after a valuable metal or mineral is extracted from the mined earth materials. For example, phosphorus mines often result in waste stacks containing predominantly gypsum as a processed waste. The waste stack gypsum is a relatively invaluable mineral left over after phosphorus is removed from the mined materials.

In many instances, waste stacks are formed as follows. First, the residual or waste material is combined with water to form a waste slurry. This waste slurry is then flowed to a settling pond where the solids contained in the waste slurry settle out. Water evaporates or permeates from the settling pond. Over time, the settled solids leave behind a stack of waste material. Some water is retained in the settled waste material which makes up the waste stack. This process of deposition settling and evaporation is repeated until the resulting waste stack is too large for the process to economically continue, or is terminated for other reasons. If needed, a new waste stack is started and grows in a similar fashion. FIG. 1 shows a mine 12 which has been in operation for a significant period of time and is surrounded by a number of waste stacks 14. The individual waste stacks 14 are often huge, frequently comprising millions of cubic yards. The amount of material currently stored in waste stacks is enormous, and it continues to increase as mining and other industries continue to produce and develop new operations.

A problem associated with waste stacks is toxic metal migration. The actual percentage of water-soluble toxic metals in a given waste stack is usually very small; for example, less than 1.0 percent. Because the waste stacks are often very large, however, the total amount of toxic materials in a waste stack is often large enough to present some risk to surrounding areas and ground water. These risks arise in part due to potential metals migration of liquids from the waste stack. The slurry water may percolate into the soil in addition to evaporating or remaining in the waste stack.

Toxic metals potentially found in waste stacks include but are not limited to Pb, Hg, U, Cd, Fe, As, Se, Cu, Cr, Ni, Zn, Co, Mn, and Ag. Over time such metals can leach out of the waste stacks and into ground water. Thus, it is desirable to keep the metals within or near the waste stacks to minimize the danger posed by such metals.

Keeping the metals within or near the stack is often difficult, especially since the metals may be present in water-soluble forms. Such water-soluble forms can migrate as metal solutes whenever water moves through the stacks. Since the stacks are frequently exposed to water, either in the form of rain or in the form of wastewater deposited on the stacks, water-soluble metals or metal compounds present in the stacks are exposed to conditions that may encourage their migration. In some situations, metals have already begun migrating out of existing waste stacks and into a boundary zone or layer below the waste stacks. Thus, it is desirable to have a method which will not only inhibit further migration of metals from the waste stacks, but which will also inhibit the migration of metals that are in a boundary layer beneath the waste stacks.

One method for containing metals within a waste stack has been to treat the waste stack with microbes that are capable of producing microbial sulfides. The microbial sulfides are sulfide byproducts of microbial activity in waste stack affected zones. The microbial sulfides react with metal ions or metal containing compounds contained in the waste stack affected zones to form metal sulfides. The metal ions or metal containing compounds contained in the waste stack affected zones become relatively insoluble during this treatment and are inhibited from migrating within or from the waste stack affected zone. This method was first disclosed in U.S. Pat. No. 5,632,715, which is incorporated herein by reference. This method has been applied successfully in treating waste stacks and inhibiting migration of metals within boundary areas within such waste stacks.

With the excavation of mining materials during the mining process, a void is typically created that is often filled with water. These large water-filled zones, typically known as pit lakes 15, contain many of the same type of contaminants as are found in waste stacks, especially when the lake is adjacent a waste stack from the mining operation. Additionally, the pit lakes have soil boundaries along the surface as well as extending down to the bottom of the lake. Metal migration continues to occur within the soil boundaries between the water and the soil. Further still, the water from the pit lakes can seep into adjacent water tables, which can result in the contamination of water systems in populated areas.

One prior art method of treating such bodies of water has been to pump the water from the lake source to a process treatment plant and then return the treated water to the pit lake. Another method in the prior art for treating such bodies of water has included taking the process treatment plant to the body of water and placing it on a boat that travels across the surface of the pit lake to treat the water at the surface level and return the treated water back to the surface.

There are several problems that exist in either solution. Firstly, both treatment solutions are expensive to conduct, as the cost of pumping the water alone can be extreme. Secondly, mixing treated water with contaminated water only causes the contaminated clean water to be re-contaminated, or require there be a secondary storage facility, which is not always available or suffers from the same soil contamination of the first pit lake. Thirdly, the plant operators must be on the water in the process on the lake method, which potentially exposes the operators to the contaminated water unnecessarily. Fourthly, these treatment solutions are at times unable to reach the depths of these pit lakes, which can have depths ranging from 50 feet to as great as 3,000 feet. Again, water pumping becomes expensive for deep pit lakes. Fifthly, certain water-filled workings are completely subterranean and are virtually impossible to access directly or the water is so deep that pumping the water from the subterranean cavity to the surface for treatment becomes cost prohibitive.

Not only must the water be treated in such conditions, but so to must the soil boundary within either the subterranean pit lake or the open body pit lake also be treated during the treatment process. The prior art methods of removing the water for treatment at a separate location, or merely treating the water on the surface of the pit lake fails to treat to treat the soil boundary of the lake simultaneously with treating the water.

Accordingly, there is a need within the industry to be able to treat contaminated water sources, such as pit lakes and subterranean mine cavities filled with water, in an economical and environmentally sound way that also includes treating the soil boundaries adjacent the water.

SUMMARY OF THE INVENTION

According to the present invention, an in situ method for treating large bodies of water having varying density strata to immobilize contaminant metals within the water is disclosed. The method is also able to treat the soil water boundary within the pit lake to provide additional immobilization. The pit lakes can include open pit lakes, subterranean mine lakes, flowing streams and the like. The method is also able to treat an abandoned mine prior to the filling of the mine with water. The invention also contemplates treating bodies of water having varying density strata.

The method, or process for in situ immobilization of metals is focused on treating large bodies of water having metals therein that are also adjacent a border of soil or earthen materials in an attempt to immobilize the metals from penetrating through the soil. Initially, the density mean of the body of water is determined, which is densest typical at regions at or approaching 4 degrees C. The process includes introducing a treatment substance that has a density greater than that of the density means into the body of water, providing at least one microbe proximate or in the body of water, producing microbial sulfides arising from the initial microbe placement, causing microbial sulfides to react in situ with metal ions or metal containing compounds located within the body of water, reducing the solubility of the metal ions by forming metal sulfides, and inhibiting the migration rate of the metal ions or other metal containing compounds within or from the soils or earthen materials as they settle out of the water. The treatment substance typically includes at least one microbe nutrient to sustain activity of the microbes added thereto. The microbial activity yields microbial sulfides that react with the contaminants within the water to form the metal sulfides.

The treatment can include more than one supplemental feeding of the treatment substance and the treatment substance can be either in liquid or powder form, which dry powder form may include pellets ranging in the size from one millimeter to 300 millimeters in diameter. The pellets, in larger size form, can be processed to have an average density larger than the density mean of the water so that the weigh of the pellets carries them past the densest regions within the water and dissolve at a rate suitable for dispersal of the treatment substance throughout the body of water.

The treatment substance, or fluid, is also buffered so as to balance the pH of the water being treated within a range of 6 to 8 pH. Accordingly, the treatment substance includes a treatment fluid having a pH range of about 1 to 12 in order to buffer the water during application. The microbes that are relied upon to generate the microbial sulfides can also occur naturally within the body of water or within the soils or earthen materials.

The treatment substance is also designed to specifically exclude cysteine. The sulfides typically react with contaminant metals including AS, SE, CD, HG, CU, CR, U, FE, ZN, PB, NI, CO, MN, and AG.

The treatment substance is further characterized to include a concentration of a carbohydrates to serve as microbial nutrients. The carbohydrate has a concentration of up to 10 grams per liter of fluid to be treated and can further include up to 0.1 grams of total nitrogen per liter of fluid to be treated. Further still, the treatment substance can also include about 0.25 grams of phosphate ion per liter of fluid to be treated or a combination of carbohydrate, phosphate ion, and total nitrogen. The phosphate can be adjusted by volume weight to carry the treatment substance below the densest regions within the body of water. The treatment substance can also include buoyant agents that carry the nutrients from lower first regions to higher second regions after the treatment substance reaches the first region, which is typically below the densest regions. This buoyant agent can be biologically derived, chemically derived, or be a gas, such as one selected from, but not limited to, $N_2$, CO, $CO_2$, $H_2$, $CH_4$, $SO_2$, $H_2S$.

In an alternative embodiment, the treatment substance comprises one or more alcohols and a carbohydrate, which can be selected from the group of whey, corn syrup, or hydrolyzed starch. In the alcohol and carbohydrate mixture, the treatment substance has generally a 3:1 ratio of alcohol to carbohydrate and can also include up to 30 mg. of total nitrogen per liter of liquid to be treated. The microbe can be selected to include one or more microbes selected of a genus coming from the group consisting of Desulfovibrio, Desulfomonas, and Desulfomaculum.

In another alternative embodiment of the present invention, a process for in situ immobilization of metals within soils located within a reservoir is disclosed that includes placing treatment substance and microbes within the soil prior to the addition of the water. Specifically, in the case where mines are back-filled with water after they have been closed, the treatment substance, whether dry or liquid, along with a microbe that generally produces microbial sulfides, is places at various locations within the mine at various elevations in order to treat the mine for in situ immobilization upon filling of the mine with water. Once the treatment substance and microbes are in place, then water begins to flow within the reservoir, which wets the soil and the treatment substance and the microbe. The microbes become active and feed upon the microbial nutrients within the treatment substance to produce microbial sulfides. The microbial sulfides react in situ with metal ions or metal containing compounds contained in the soil or otherwise soluble within the flowing water to form metal sulfides. This reaction causes the metal ions or metal containing compounds to be reduced in solubility and eventually precipitate out as metals sulfides into the soil or other earthen boundaries within the reservoir.

BRIEF DESCRIPTION OF THE DRAWINGS

The foregoing and other features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF SPECIFIC EMBODIMENTS

Figure 1:
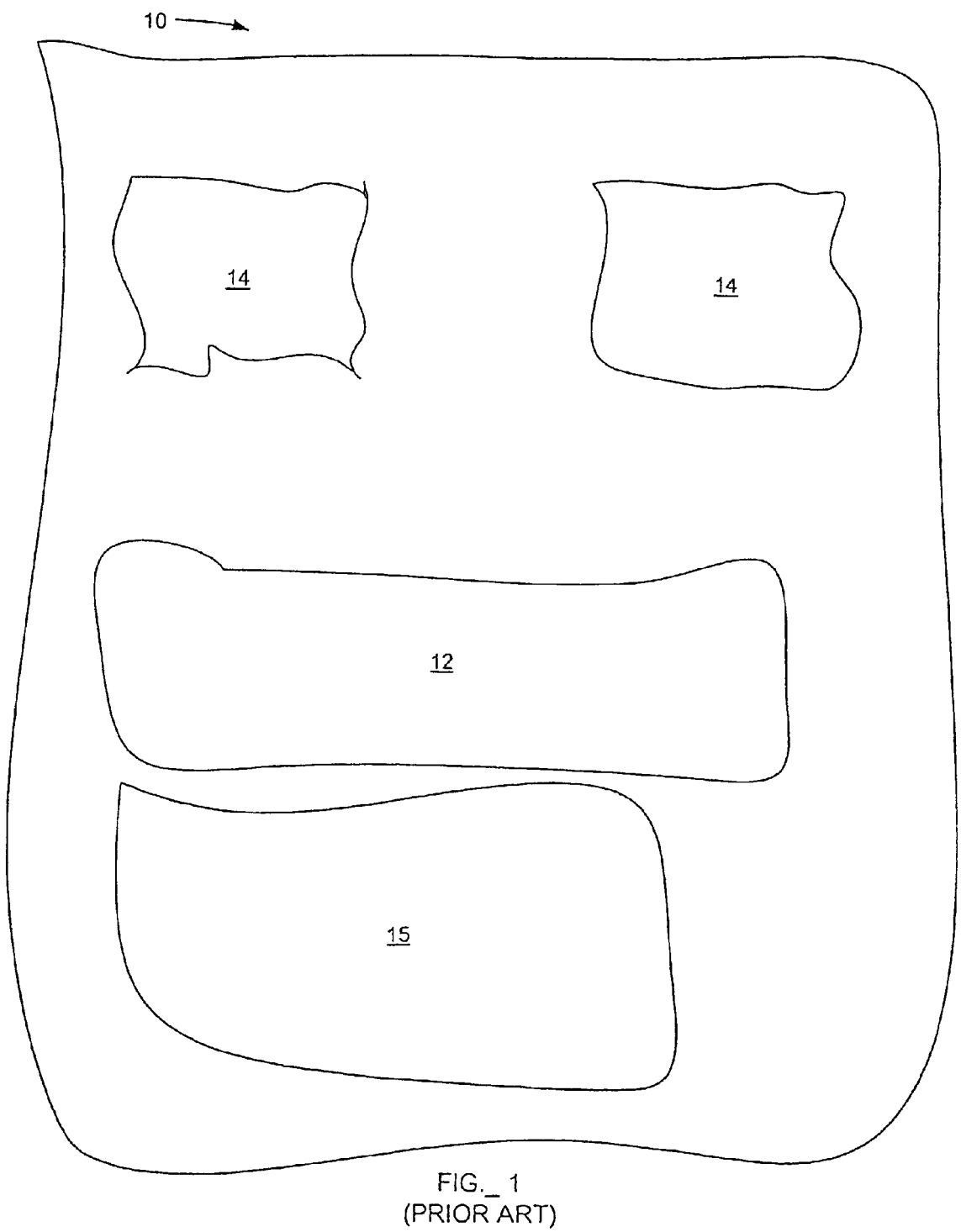
FIG. 1 is a top view of a prior art mining area showing a mine surrounded by a number of waste stacks and a pit lake.

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 2 through 5, is not intended to limit the scope of the invention, as claimed, but is merely representative of the embodiments of the invention.

The specific embodiments of the invention will be best understood by reference to the drawings, wherein like parts are designated by like numerals throughout.

FIGS. 2–5 illustrate selected forms of the present invention. These forms of the invention are expected to apply to the following situation. A pit lake 14 is provided over a subadjacent soil or other support earth materials 16. A water soil interface 18 results from where pit lake 14 meets soil 16. Water soil interface 18 extends along a base 20 of pit lake 14. One or more water-soluble forms of one or more toxic metals, such as selected from the group consisting of Pb, Hg, Cd, Fe, As, Se, U, Cu, Cr, Ni, Zn, Co, Mn, and Ag exist within pit lake 14 and may be rendered less mobile by the inventive process taught in accordance with the present invention. Such toxic metal contaminants typically exist at relatively low concentration levels, 0.001–1000 parts per million.

Figure 2:
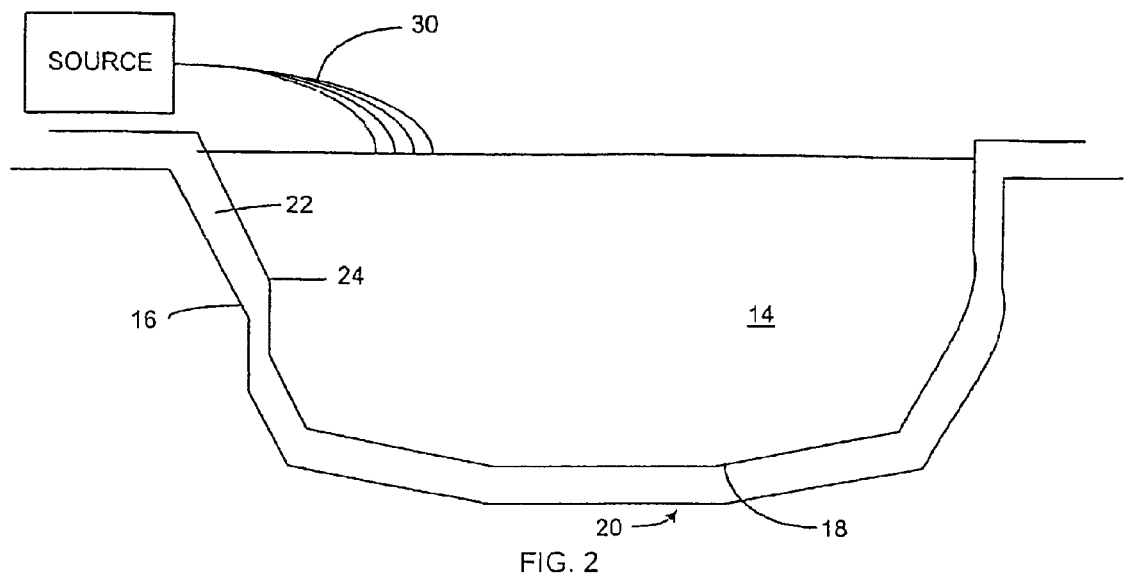
FIG. 2 is a sectional side view of a pit lake affected zone being treated according to a first embodiment of the invention. Treatment liquids are being applied onto the surface of the pit lake.

As shown in FIG. 2, a metal-containing boundary layer or boundary zone 22 may also exist adjacent to pit lake 14. Metal-containing boundary zone 22 may exist if pit lake 14 is exposed to a waste stack or other tailings zone that has water leaching toxic metals out of the waste stack and past the water soil interface 18, thereby forming metal containing boundary zone 22.

Pit lake 14, together with any present metal-containing boundary zone 22, defines a water soil affected zone 24. In accordance with the principles of the present invention, a method is disclosed that immobilizes the toxic metals in situ within the water soil affected zone 24 to inhibit substantial migration of these toxic metals and prevent movement of contaminants into an extended area 26.

In one form, the method includes utilizing the biological activity of microbes to generate sulfides in pit lake 14, which treatment extends throughout the water soil affected zone 24. The microbially-produced sulfides, which are referred to herein as microbial sulfides, are combined with toxic metals in the affected zone to convert the metals into metal sulfides. In one exemplary embodiment of the present invention, the microbially produced sulfides react with metals or metal ions such as selected from the group consisting of Pb, Hg, Cd, Fe, As, U, Se, Cu, Cr, Ni, Zn, Co, Mn, and Ag. The toxic metals may be in the form of metal ions, metal ion complexes, or metal containing compounds. A possible mechanism for the conversion to metal sulfides, using the cadmium ion as an example metal ion, is:

$$C_6H_{12}O_6 + NAD + H+ >> 6CO_2 + 6H_2O + NADH \quad (1)$$

$$10NADH + SO_4^{2-} >> H_2S + 10NAD + 4H_2O \quad (2)$$

$$H_2S(aqueous) + H_2O >> H_3O^+ + HS^-(aqueous) \quad (3)$$

$$HS^- + H_2O >> S^{2-} + H_3O^+ \quad (4)$$

$$Cd^{2+}(aqueous) + S^{2-}(aqueous) >> CdS(solid) \quad (5)$$

In the shown mechanism, NAD is nicotinamide adenine dinucleotide, which is used ubiquitously in biological transport mechanisms.

Once metal sulfides, or other sulfided metallic forms, are formed, the complexed metals become relatively insoluble in water and tend to precipitate out of the water and into the boundary 24. The metals are thereby held in the soil and boundary zone 24, preventing further water-borne migration.

It is believed that a variety of microbes that generate appreciable quantities of sulfides can potentially be used in the treatment methods of the present invention. For example, microbes of the genera Desulfovibrio, Desulfomonas and Desulfomaculum are known to generate appreciable quantities of sulfides as a by-product of their growth and general biological activity. They are believed to be suitable for use in the present invention. Three specific embodiments of the present invention will now be described in detail.

First Embodiment

As illustrated in FIG. 2, a first embodiment of the present invention comprises treating an open body of water known as pit lake 14 to deliver a treatment solution with sustaining nutrients on the surface of pit lake 14. The effective treatment of the pit lake 14 along with the water soil affected zone 24 requires a reasonable calculation of the volume of water found within pit lake 14 as well as the surface area of the water soil boundary area 20. Further still, the present invention requires a reasonable estimate of the amount of metal contaminants within the affected zone 24 so that a reasonable calculation of the required microbial sulfide, with requisite nutrients, can be delivered to the pit lake 14 for treatment.

During the determination of the pit lake size and the boundary zone size, the pH is measured in the water to determine if some areas are within a pH range of from about 3.0 to about 10. What is important is that there be a potential biological activity zone wherein the microbial sulfides, along with their nutrients, can flourish for the immobilization of the water soluble metals within the affected zones.

Once the pH has been determined to be sufficient enough to provide a biological activity zone, or the lake has been treated in such a way as to provide a temporary biological activity zone, a treatment liquid 30 is introduced onto the surface of pit lake 14. Typically, a source is provided from which treatment liquid 30 is sprayed onto the surface of pit lake 14 and convection currents along the surface distribute the liquid across the entire surface and within the varying depths of the water. The injection of the treatment liquid 30 can be either mechanically delivered or gravity delivered.

Treatment liquid 30 is primarily constituted of a suitable liquid base, such as water. In addition to the water or other liquid base, there are a number of additional constituents within the liquid. Treatment liquid 30 also includes at least one microbe nutrient that is capable of sustaining biological activity of at least one microbe. Specifically, treatment liquid 30 will comprise an appropriate nutrient supplement necessary for microbes to grow within the water of open lake 14 as well as at the affected zone 24 and produce sulfides. Such appropriate nutrient supplements are readily determinable by persons skilled in the art of microbial growth. Further, treatment liquid 30 should not contain excess nutritional supplements beyond what is necessary for the microbes to grow and produce sulfides. Such excess nutritional supplements would result in economic waste, and potentially inhibit the anaerobic respiration necessary to form sulfides. This form of inhibition is commonly known as fermentation.

The particular concentration of microbe nutrient varies depending upon a pre-determined bio-availability of nutrients and the chosen speed of biological activity for the given application. The concentration of microbe nutrient also depends upon the particular nutrient that is being employed. The concentration of microbe nutrient also depends upon other aspects of the particular pit lake 14 and adjacent boundary areas 24 being treated. For example, the chemistry of a particular boundary area 24 may be relatively less favorable or more favorable to microbial conversion of the nutrient, which requires that the amounts used are adjusted to effect microbial growth and sulfide production to immobilize metals. An exemplary range of nutrient concentration is from about 0.1 to about 10 grams of nutrient per liter of liquid 30.

In one form of the invention, treatment liquid 30 includes a carbohydrate microbe nutrient. Carbohydrate microbe nutrient is in the form of either molasses, hydrolyzed potato starch, whey from milk or milk by-products, and whey from milk or milk by-products with the protein fraction removed or substantially removed.

In another form of the invention, treatment liquid 30 includes a carbohydrate microbe nutrient. The microbe nutrient is typically selected from one of the following types of nutrients, including molasses, hydrolyzed potato starch, whey from milk byproducts, and whey from milk byproducts with the protein fraction removed or substantially removed. A list of microbe nutrients includes alcohols, partially hydrolyzed amylosk or celldosis fractions, aerosol gelling components enabling treatment of a shallow lake or other temporarily buoyant organic sawdust or straw. The treatment liquid 30 is delivered as a treatment volume of generally 1 gram of treatment liquid for each liter of liquid to be treated. The alcohol and carbohydrates are mixed in a 3:1 ratio of alcohols to carbohydrates. About 30 milligrams of total nitrogen per liter to be treated is also added to the treatment liquid.

In an alternative embodiment of the present invention, treatment liquid 30 can include a carbohydrate microbe nutrient and a biologically suitable and utilizable nitrogen source. The nitrogen source is included in amounts sufficient to provide concentrations within the treatment liquid from about 0 to about 500 milligrams per liter, or on a more constricted range from about 5 to about 100 milligrams per liter of N. Further, in this exemplary embodiment of the invention, it is anticipated that the carbohydrate microbe nutrient includes sugars and alcohols in a concentration of about 1 gram per liter total carbohydrate and about 10 milligrams nitrogen per liter of liquid to be treated.

In another alternative embodiment of the invention, treatment liquid 30 comprises a carbohydrate microbe nutrient, phosphate ions, and nitrogen source. Suitable sources of phosphate ions include sodium phosphate, potassium phosphate, ammonium phosphate and potentially other phosphates. The phosphate ion is included in sufficient amounts to provide concentrations in the treatment liquid from about 0.010 to about 0.25 grams per liter of liquid, or contaminated lake water, to be treated, and up to 0.1 grams of total nitrogen per liter of fluid to be treated. Thus, the volume of liquid to be treated is determined, the water is tested for contaminant types and concentrations for each contaminant intended to be treated, then the amounts of nutrient, phosphate ions, and nitrogen source are each determined for addition to the lake depending upon the concentrations of contaminants.

In one specific embodiment of the present invention, the cysteine content of the microbe nutrient will be low. Cysteine can interfere with microbial production of sulfides. Accordingly, the cysteine content in the treatment liquid is kept low or is actually excluded from treatment liquid 30 so as not to inhibit the production of microbial sulfides during treatment.

Treatment liquid 30 also comprises a pH to oppose the pH of the surface of pit lake 14, relative to a neutral pH 7. Thus, if the surface of lake 14 is alkaline, treatment liquid 30 is preferably acidic, also if the surface is acidic, treatment liquid 30 is alkaline. Treatment liquid 30 is buffered so as to improve formation of the temporary bio-activity zone of the treatment liquid within lake 14.

Sulfide producing microbes are known to generally grow best in an environment with a pH from about 4 to about 7. A region within soil water boundary area 24 referred to herein as a biological activity zone. The pH and buffer capacity of treatment liquid 30 is adjusted such that the interaction of boundary area 24 creates a biological activity zone within water and soil boundary. Again, the method of this invention comprises providing at least one sulfide-producing microbe capable of growing in the presence of treatment liquid 30. The microbe may be provided before, after, or during the injection of treatment liquid 30, and is placed in proximity to the surface of pit lake 14 with treatment liquid 30.

In one embodiment of the invention, the step of providing the sulfide-producing microbe comprises treating the surface of pit lake 14 with at least one microbe. The microbe may be placed on the surface of pit lake 14 prior to, subsequent to, or during the injection of liquid 30 onto the surface of pit lake 14.

In an alternative embodiment of the invention, the step of providing the sulfide-producing microbe comprises mixing the microbe with treatment liquid 30 and delivering the mixture onto the surface of pit lake 14 to begin the in situ immobilization of contaminating metals within pit lake 14.

In yet another alternative embodiment of the invention, the step of providing the sulfide-producing microbe comprises utilizing microbes already existing within pit lake 14 before liquid 30 is administered. The pre-existence of microbes within pit lake 14 may be due to human implantation, air-borne dispersion, or natural conditions of the open pit lake 14.

In accordance with the present invention, the method can also comprise the step of administering one or more supplemental feedings of treatment liquid 30 onto the surface of pit lake 14. The supplemental feedings are administered after at least one prior treatment of treatment liquid 30, and is typically provided after the sulfide-producing microbes have begun growing. The supplemental feedings are provided to sustain the growth of the sulfide-producing microbes. The sulfide-producing microbes will produce sulfides over a longer period of time when supplemental feedings are provided. Such long-term generation of sulfides increase the immobilization of the metal ions, and minimize losses of microbial nutrient due to fermentation. Since sulfides may eventually be displaced from the coordination sphere of the metal ions through equilibrium processes, the long-term generation of sulfides helps to insure that such displaced sulfides are rapidly replaced or supplemented by other sulfides, as in the transition from pyrrhotite ($Fe_{1-x}S$) to pyrite ($FeS_2$) or marcasite.

Further, as an alternative to the use of a carrier liquid to deliver the nutrients and microbes to the affected zone, solid materials that are not wet or liquid can be used instead. For example, the treatment substance can be a powder of nutrients that is activated simply by contact with the water in the pit lake. This powder can be dispersed using air dispersal or air drop via aircraft. This is convenient also when the lake is too remote for pumping trucks to access for direct delivery at the shore. The treatment substance can also be less refined than a powder, either in pellet or clump form. The pellets can range in size from 0.1 mm to 300 mm. It is understood that smaller sized pellets or powders achieve a larger overall surface area that can react within the treated water. The larger sized pellets also serve as a time release mechanism as well since the larger diameter pellets take longer to dissolve than the smaller pellets or powder. Additionally, the treatment substance when in liquid form can also be dispersed aerially via aircraft when border delivery is not possible.

Second Embodiment

Figure 3:
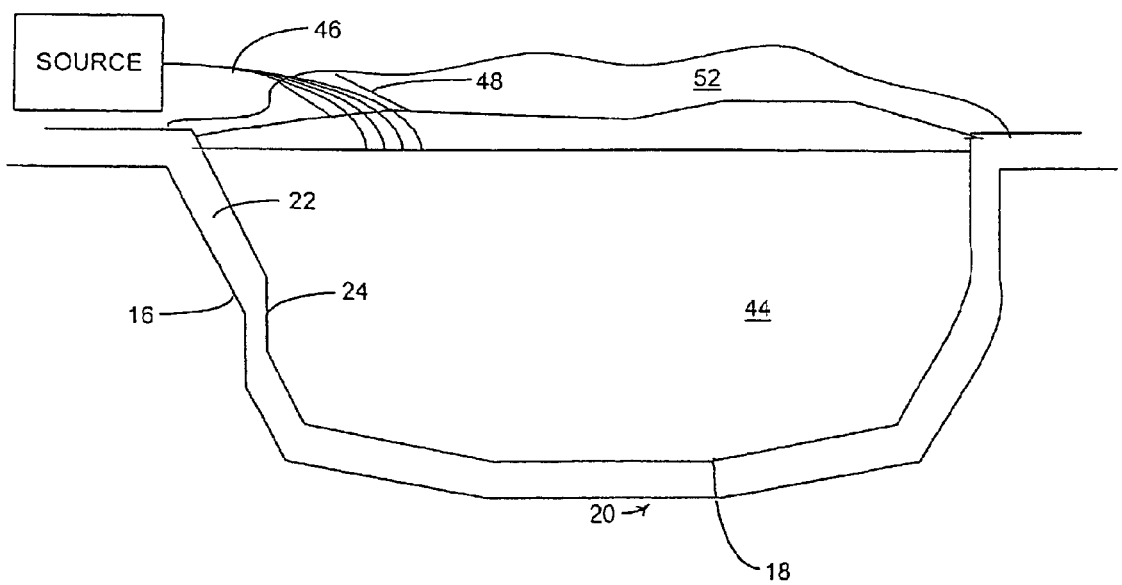
FIG. 3 shows a sectional side view of a subterranean pit lake being treated according to a second embodiment of the invention. Microbe nutrients are being flowed into the lake as accessed via a chamber.

FIG. 3 illustrates a second embodiment of the present invention where the body of water is actually a subterranean lake within the cavity of an abandoned or existing mine. Subterranean lake 44 also includes an affected soil water boundary area 28 like that of FIG. 2. The water within subterranean lake 44 is treated using a water treatment composition 46. Treatment composition 46 permeates the water in lake 44. One or more delivery chambers 48 are formed in the top surface of the soil 52 above lake 44. These chambers 48 are placed at several locations to provide a uniform dispersion of treatment liquid 46 within lake 44. These chambers are formed using conventional drilling techniques known to those skilled in the art or are previously formed tunnels or shafts formed during the mining operations. Natural caves and tunnels can also serve as delivery channels for the treatment composition. Next, the treatment composition 46 is then delivered into lake 44 either via mechanical feed or gravity feed. The composition of treatment composition 46 is similar to that of treatment liquid 30 described above.

There are three types of subterranean lakes that need to be considered. These lakes include a static lake, a sinking lake, and a gaining lake. The static lake has a constant volume that is either constant because of no inflow and outflow, or is constant because there is a steady inflow meeting the same rate of outflow. In either event, the volume of the water stays relatively constant. The sinking lake is one where the outflow rate exceeds the inflow rate and is draining at a given rate. The gaining lake is one where the inflow rate exceeds the outflow rate and therefore the volume continues to increase. It is important to know what type of lake is to be treated as it is important to attempt to treat the lake at the locations as close to the inflow sources as possible so that the treatment composition can permeate throughout the water and affect the soil boundaries within the water as thoroughly as possible. Should the treatment composition be added in an outflowing region, then the treatment would occur along the path traveled by the outflowing stream and not affect the general body of water upstream from the outflow region. Thus, placing treatment composition nearest the inflow sources helps to distribute the treatment composition within the body of water in a manner most effective in providing in situ immobilization.

Thus, for gaining lakes, sinking lakes, and static lakes that have a constant inflow and outflow, addition of treatment composition at the point of input increases the chances of distributing the treatment composition throughout the water zones occupied in the abandoned mine. Accordingly, the chambers 48 are placed at locations as close as possible to the source of inflow into the subterranean cavity.

In static bodies of water where there is no inflow or outflow, there is little problem of contamination or a requirement that in situ immobilization be performed; however, in the event a breech occurs that allows the water to flow out of the underground pit, treatment a priori prevents mobilization of contaminate metals in accordance with the present invention. The process of performing in situ immobilization within such bodies of water is also accomplished within one or more embodiments of the present invention. Specifically, the treatment composition 46 can be introduced within a static body within a carrier agent that can generate a gas phase atmosphere of nitrous that carries the reducing agent within all parts of the chamber. Testing of the water sample is necessary in order to determine whether the water has reached a saturation level where nitrous would not diffuse within the water for one. Thus, it is contemplated that the treatment composition would be prepared in such a manner as to have a density greater than that of the body of water to which it is introduced. This greater density allows the treatment composition to settle near the bottom or in other locations at points lowest areas to be treated such that during the gas phase transition, or the transition from a liquid or solid composition into a gas-based carrying agent, the gas phase would introduce and lift the reducing agent upward and outward.

The method of the present invention may further comprise a step of providing one or more supplemental feedings of microbe nutrient into affected zone 44 using one or more additions of pool treatment composition 46. The supplemental feedings should be flowed onto the stack after at least one prior feeding of microbe nutrient, and preferably after the sulfide-producing microbes have begun to grow. The supplemental feedings are provided to sustain the growth of the sulfide-producing microbes. It is anticipated that the sulfide-producing microbes will produce sulfides over a longer period of time if supplemental feedings are provided. As discussed previously, long term generation of sulfides is advantageous for maximally immobilizing metal ions.

It is intended in the present invention that the treatment of the large volume of water either in the open pit lake or in a subterranean pit lake that the microbial sulfides eventually interact with the soil boundary between the soil and the water such that in situ immobilization of contaminant metals at such soil points is obtained. For example, as the microbial sulfides increase due to the nutrients added, they filter throughout the water zone of the pit lake neutralizing soluble metals within the water. Further, they migrate towards the borders of the soil and are utilized to provide in situ immobilization of the water soluble metals located within the soils. Supplemental feedings encourage the growth of such sulfide producing microbes such that within a short period of time, on the order of one to four months. The supplemental feedings are continued until test samples of the water show a reduced level of contaminants, and that the soils adjacent the water also show a greatly reduced level of contaminants being treated.

Third Embodiment

Figure 4:
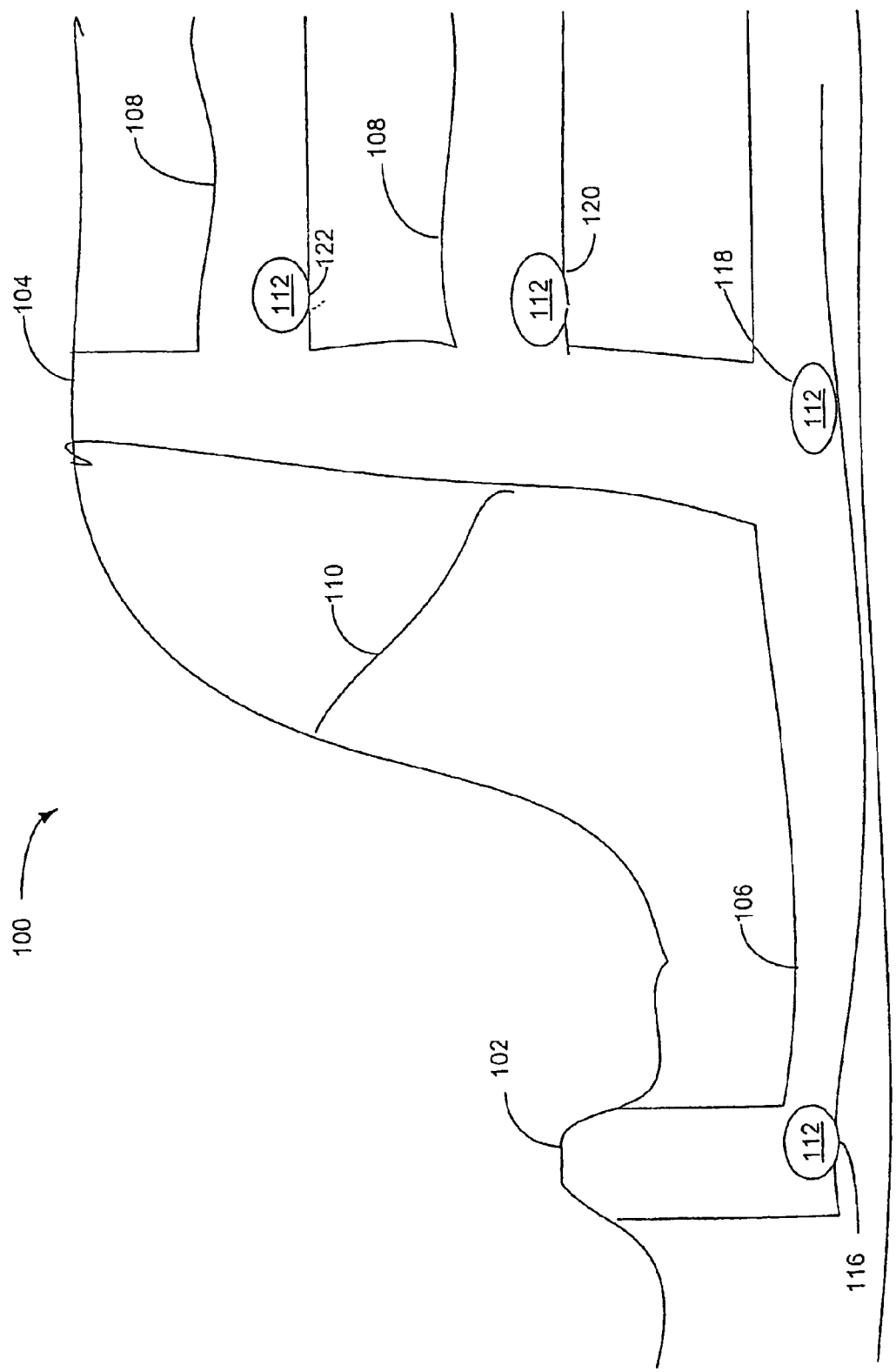
FIG. 4 shows a sectional side view of an abandoned mine prior to back filling with liquid and that is being treated according to a third embodiment of the invention. Microbe nutrients are placed at various points within the mine to optimize treatment as the mine is filled with liquid.

FIG. 4 illustrates a third embodiment contemplated within the present invention. This particular embodiment relates to the anticipated filling of a mine to be closed. At this point, there is no water of significant volume within the mining cavity. It is recognized that the soil boundaries within the mine are contaminated and it is useful to immobilize the heavy metals to prevent their immobilization out of the mine and into adjacent water tables or soil boundaries. Further, it is desirable to treat the water that also carries the heavy metals and immobilize them as early as convenient as possible. Accordingly, as is illustrated in FIG. 4, an abandoned mine is illustrated.

Mine 100 has a cap head 102 located at an outer opening above a surface opening of the mine. A main shaft 104 is illustrated penetrating from a top surface downward to a lowest horizontal shaft 106 that was used to excavate material from within the mine 100. Additional mining shafts in a horizontal plane are illustrated as shafts 108. Mine veins 110 are also illustrated that typically provide a passage from open shaft 104 to the outer surface of the mine. These veins 110 typically are sealed to prevent seepage or leaking or evacuation of material from within the mine.

Since mine 100 is to be filled with water, treatment of the mine prior to filling is done in accordance with the present invention. Specifically, mine 100 is treated by placing nutrients throughout the abandoned mine prior to filling the mine with liquid. The nutrients are consistent with those described above that encourage the growth of sulfide producing microbes as defined and described within the present invention. These locations are placed in the mine at different stages in advance of water penetration during the filling of the mine. For example, a first nutrient 112 is located in excavation shaft 106.

Nutrients 112 are placed at the lowest level so that as the water, which typically finds its lowest level during filling, will activate the nutrients and the microbes to begin the growth of the sulfide producing microbes to reduce the metal contaminants for in situ immobilization. Additional nutrients and microbes 112 are located at various other positions within the mine as identified at sites 116, 118, 120, and 122. Thus, as the water level rises, the water reaching a particular nutrient package activates the nutrient package to produce the sulfide producing microbes. This enables the mine to be treated not only incrementally as the water fills, but also completely as the soil boundaries are wetted and begin releasing the contaminated metals within the water.

Thus, it has been taught to treat a mine or cavity in advance of its filling with water as a way of minimizing any metal mobilization within the soil boundaries or the water.

Fourth Embodiment

Figure 5:
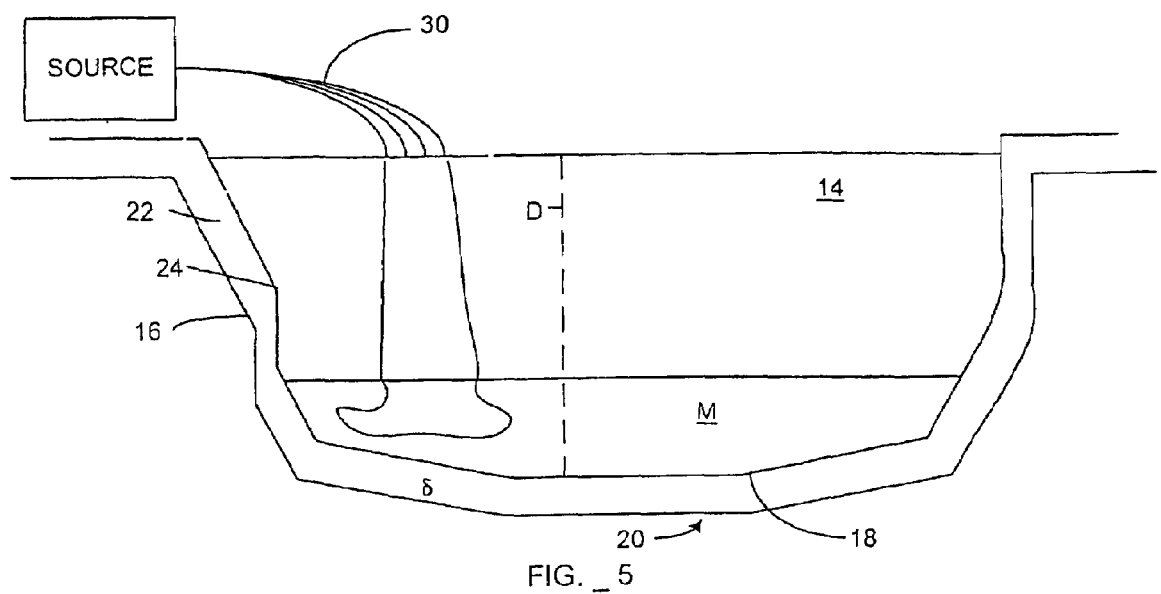
FIG. 5 shows a sectional side view of an open pit lake having various strata of densification and being treated according to the present invention to account for the varying densities within the pit lake.

The method for treatment of large bodies of water disclosed includes the addition of biological or chemical reagents to a lake surface and distributed to various depths. The reagent dosage at depth is controlled by the several parameters: reagent density, droplet size and miscibility. Large bodies of water, such as open pit lakes, are subject to the seasons with the various weather changes they bring. The lakes are subject to freezing during the winter and warming well above freezing during the summer. These temperature extremes, along with naturally occurring and varying wind forces, lead to stratification of the water into different density regions as shown in FIG. 5. In accordance with principles of the present invention, a method is disclosed to enhance the distribution of reagents to perform a specific chemical transformation without the need for further mechanical mixing regardless of the varying density regions found with a subject pit lake.

FIG. 5 illustrates a side view of a pit lake 14 having a depth D and an immobilization boundary 22. Lake 14 has a maximum density region M, which is determined by temperature sampling of the lake at varying depths. The colder the water, the denser the water becomes until 4° C. Thus, where the temperature is noted to be approximately 4 degrees Celsius at level M, the maximum density of the water is obtained. There may be varying levels of strata, but in this example, the M level is the most dense. As such, the treatment composition needs to be designed to penetrate this density level only, since it is the maximum density.

One example of the treatment composition utilized to perform in situ immobilization of contaminant metals in accordance with the present invention comprises in large part sugar syrup, which has a density of 11 lbs/gallon, and alcohol (methanol or ethanol), which has a density of 6.6 lbs/gallon. The sugar syrup and alcohol are blended continuously by setting the flow rate of the controlling constituent, in this example alcohol, and then modulating the flow of the densifying constituent in order to achieve a suitable density that exceeds the Maximum density of any strata level within lake 14. The densifying constituent has a greater variance from the desired mean density, thereby controlling the maximum or ultimate settling depth within the lake. In addition, both the miscibility and the solubility of these constituents is varied to accomplish the same effect. Alternatively, the density needs only exceed the mean density of the lake since the composition will itself have denser portions that reach through the densest strata levels of the lake.

A deep pit lake, such as created in mining operations for copper, gold or other minerals, is exposed to yearly freeze/thaw variation and moderate fetch (wind force) that stratifies the water into different thermally defined layers. The addition of a nutrient within the treatment composition to enable bio-reduction along a given electro-potential series to re-mineralize metallic species or to remove other contaminants effectively treats only one layer of the lake since it poorly mixes with the other layers. Further it is likely to be unsuccessful in meeting regulatory requirements due to re-oxidation (half reaction couple 1 and 2) before useful consumption in the desired half reaction couple 1 and 3:

$CH_3OH + H_2O = CO_2 + 6H^+ + 6e^-$ Rxn 1:

$4H^+ + O_2 + 6e^- = H_2O$ 1+2: Methanol+Oxygen=CO2 and Water. Rxn 2:

$SeO_4^{2-} + 8H^+ + 10e^- = Se^0 + 4H_2O$ 1+3: Methanol+Selena=CO2Se Rxn 3:

Since these reactions are biologically catalyzed, the addition of phosphate, which has a density of 14.2 lbs/gallon, provides another degree of control of delivery depth and enhance biological growth.

An alternative method of enhancing mixing is through biological or chemical generation of a gas such as nitrogen from reduction of nitrates as in coupling reaction 1 to reaction 4:

$$2NO_3^-+12H^++10e^-=N_2+H_2O. \qquad \text{Rxn 4:}$$

Rising gas bubbles serve to carry excess settled sugars and reduced gases such as sulfide toward the surface and react with reducible oxidized species along the way. This enables the treatment composition to extend to the water/soil or earth interface immobilization zone as described above to store reductive nutrients for future treatment of species mobilizing from the pit high walls as well as all points between the zone and the surface of the lake.

The invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A process for in situ immobilization of metals in a body of water having metals therein and having a border of soil or earth materials, comprising:

- introducing a solid treatment substance into the body of water, the treatment substance including at least one microbe nutrient to sustain activity of at least one microbe;
- providing at least one microbe proximate to or in the body of water to receive the treatment substance therefrom, the at least one microbe being capable of growing in the presence of the treatment substance;
- producing microbial sulfides that are sulfide by-products of microbial activity in the body of water;
- reacting the microbial sulfides in situ with metal ions or metal-containing compounds contained in the body of water to form metal sulfides;
- reducing solubility of the metal ions or metal-containing compounds contained in the body of water as a result of forming the metal sulfides;
- inhibiting the migration rate of metal ions or metal-containing compounds within or from the soils or earth materials; and
- varying at least one of a particle size and a density of the solid treatment substance to thereby control a release rate of the at least one microbe nutrient from the solid treatment substance to thereby control the production of microbial sulfides.

2. A process according to claim 1 wherein the step of introducing a treatment substance is further characterized by the at least one microbe nutrient including a carbohydrate microbe nutrient.

3. A process according to claim 1 wherein the process further comprises a step of introducing one or more supplemental feedings of treatment substance.

4. A process according to claim 1 wherein the step of providing at least one microbe includes relying upon natural microbes which exist in the soils or earth materials.

5. A process according to claim 1 wherein the step of reacting the microbially produced sulfides comprises reacting the microbially produced sulfides with at least one metal selected from the group consisting of As, Se, Cd, Hg, Cu, Cr, U, Fe, Zn, Pb, Mn, Mo.

6. A process according to claim 1 wherein the step of introducing a treatment substance is done using a treatment substance which is sufficiently low in cysteine content so that the at least one microbe are not inhibited from producing microbial sulfides.

7. A process according to claim 1 wherein the step of introducing a treatment substance is further characterized by a treatment substance which achieves a concentration of up to 10 grams of carbohydrate per liter of fluid to be treated.

8. A process according to claim 1 herein the step of introducing a treatment substance is further characterized by a treatment substance that achieves a concentration of up to 10 grams of carbohydrate per liter of fluid to be treated and up to 0.1 grams of total nitrogen per liter of fluid to be treated.

9. A process according to claim 1 wherein the step of introducing a treatment substance comprise introducing and flowing a treatment substance that achieves a concentration of up to about 10 grams of carbohydrate per liter of fluid to be treated, up to 0.25 grams per liter of phosphate ion and up to 0.1 grains of total nitrogen per liter of fluid to be treated.

10. A process according to claim 1 wherein the step of introducing a treatment substance is further characterized by a treatment substance that comprises of molasses, whey, corn syrup, hydrolyzed starch, other carbohydrate laden liquids and alcohols.

11. A process according to claim 1 wherein the step of introducing a treatment substance is further characterized by a treatment substance that comprises approximately of 1 gram of treatment substance per liter of fluid to be treated, in a ratio of 3:1 alcohols to carbohydrates, and approximately 30 milligrams per liter of total nitrogen.

12. A process according to claim 1 wherein the step of providing at least one microbe comprises providing one or more microbes of a genus selected from the group consisting of Desulfovibrio, Desulfomonas and Desulfomaculum.

* * * * *